US005694552A

United States Patent [19]

Aharoni

[11] Patent Number: 5,694,552
[45] Date of Patent: Dec. 2, 1997

[54] FINANCING METHOD INCORPORATING NEW USE OF TRADE ACCEPTANCE DRAFTS

[76] Inventor: Amos Aharoni, 2600 Netherland Ave., Bronx, N.Y. 10463

[21] Appl. No.: 506,539

[22] Filed: Jul. 24, 1995

[51] Int. Cl.$^6$ .................................................. G06F 17/60
[52] U.S. Cl. ........................................................ 395/237
[58] Field of Search ........................... 395/240, 237, 395/235, 244, 239, 245

[56] References Cited

PUBLICATIONS

Gordon Platt, The Journal of Commerce Financing Trade Column, The Journal of Commerce, Dec. 8, 1993, Aug. 1993.

*Primary Examiner*—Donald E. McElheny, Jr.

[57] ABSTRACT

A new method of using a trade acceptance draft TAD which is a financial instrument executed by a maker which is for a specific amount payable on a predetermined future date and drawn upon a specific account of the maker maintained at a specific bank. The maker as a first party sends a TAD to a second party as payment of a debt owned to the second party by the first party. The second party upon receipt endorses the TAD to a third party. The second party sells the endorsed TAD to the third party and delivers the endorsed TAD to the third party whereby the third party receives the endorsed TAD as a holder in due course.

8 Claims, No Drawings

FINANCING METHOD INCORPORATING NEW USE OF TRADE ACCEPTANCE DRAFTS

BACKGROUND OF THE INVENTION

Traditional account receivable financing methods employ a financial institution, such as a bank or factoring company, which purchases open accounts receivables from sellers of goods or services. There are two different methods of purchasing these accounts. In the first method, the purchasing institution accepts the credit risk of the receivable by making the purchase without recourse back to the seller in the event of non-payment. In the second method, the purchase is made with full recourse back to the seller in the event that the receivable is not paid when due. However, even if the purchasing institution assumes the credit risk, this assumption is applicable only when non-payment is the result of the financial inability of the buyer to pay. Non-payment arising because of commercial dispute between buyer and seller is generally not covered by the institution's assumption of credit risk and in such case the purchasing institution will have full recourse back to the seller.

Typically, when traditional account receivable financing is employed, the order of events is: (1) a Buyer places a purchase order with the Seller; (2) the Seller delivers the goods or services and invoices the Buyer for the purchase price; and (3) the account receivable created by such transaction is sold to the financial institution who typically advances a portion of the purchase price, depending primarily upon the financial strength of the Seller, with the balance being paid upon receipt of payment from the Buyer. If credit "insurance" is offered by the financial institution and accepted by the Seller, usually the financial institution will pre-approve the transaction at the time the order is received by the Seller, and, upon purchase of the receivable, the institution will assume the risk of non-payment by the Buyer due to Buyer's inability to pay at the due date. If the Buyer does not pay the account within an agreed-to period, and the non-payment is due to a commercial dispute or any reason other than the Buyer's inability to pay, the financial institution charges back the uncollected receivable to the Seller who is obligated to repay the advance.

Under this traditional system, the financial institution literally "stands in the shoes" of the Seller, with all of its rights and obligations being dependent upon the direct legal relationship between Buyer and Seller, subject to any and all claims which the Buyer may have against the Seller, including claims for damaged or defective goods, and even claims unrelated to the transaction which gave rise to the receivable which was sold to the financial institution. Such claims if substantiated and proven by the Buyer can relieve the Buyer from its obligation to pay the receivable.

In accordance with the principles of this invention, a new financing method has been created for management, processing and financing of open accounts inorporating a new use of a known type of financial instrument called a Trade Acceptance Draft (TAD).

This instrument is prepared by a Seller and submitted to a Buyer at the time of delivery of the goods or services contracted for. Upon receipt of the goods or services, the instrument is accepted by the Buyer (that is, it is signed by the Buyer) and is returned to the Seller in payment for the goods or services. The TAD is for a specific amount (the cost of the goods or services) payable on a predetermined future date, drawn against a specific bank account of the Buyer maintained at a specified bank.

In a practical sense, a TAD resembles a post-dated check in that on its due date it is deposited for collection through the normal banking system and is processed by Buyer's bank like any other check drawn against Buyer's account. When the Seller elects to sell these TADs to the financial institution, the Seller endorses each TAD to the order of the financial institution, and offers it for sale under the terms of its agreement with this institution.

The TAD is a fully negotiable instrument which creates a direct legal obligation between the Buyer and the financial institution which is not based upon the relationship between the Buyer and the Seller. Consequently, the financial institution acquires the TADs as a holder in due course and thus is free of any claims that the Buyer may have against the Seller.

The new financial method employs a new use of TADS and enables Sellers and Buyers to agree upon extended payment terms which typically would be unavailable and permits each to manage its cash flow and dramatically reduce the time and manpower typically devoted to the collection of traditional open accounts receivable. Unlike traditional receivables financing methods which are based upon credit-worthiness of the Seller, the new financing method disclosed and claimed herein looks primarily to credit-worthiness of the Buyer to establish the financing parameter of the TADs.

SUMMARY OF THE INVENTION

In accordance with the principles of this invention, the new financing and collection method employs a new use of TADS and requires the contractual cooperation of the Seller, its Buyers who qualify, and a financial institution. This method creates an independent legal relationship between the Buyer of the goods or services and the financial institution involved wherein the Buyer cannot interpose disputes between itself and the Seller as a means for relieving or mitigating Buyer's obligation to pay for the goods or services.

Under this new method, a Seller and a Financial Institution first conclude a TAD Participation Agreement which defines the rights and obligations of each of these two parties concerning the use of one or more TADs which will be received by the Seller from its Buyers in payment for goods and services provided. This Participation Agreement defines all of the essential terms between the Seller and the Financial Institution, including the procedures for Seller accepting TADs from its Buyers and the obligation of the Financial Institution to purchase the TADs from the seller and the procedures and conditions by which a Seller must obtain pre-approval of a particular transaction in order to obtain credit protection in the event that a Buyer does not pay the TADs when due because of financial inability to pay as for example, bankruptcy, termination of business operations and the like.

After the TAD Participation Agreement has been concluded between the Seller and the Financial Institution, the Seller solicits participation of Buyers. Once a suitable Buyer is willing to participate, the Buyer and the Seller conclude a TAD Program Agreement wherein the Seller agrees to sell goods and/or provide services to this Buyer and this Buyer agrees to use TADs as payment for the goods and/or services. The TAD Program Agreement establishes the basic terms and conditions between this Buyer and Seller.

Once both the TAD Participation Agreement and the TAD Program Agreement have been executed by the parties, a typical transaction will the order of events is as follows: (1)

a Buyer places a purchase order with the Seller; (2) the Seller delivers the goods or services and submits to the Buyer a TAD drawn against a specific account of the Buyer at a bank designated by the Buyer in the amount of the purchase price and payable at a date agreed to between the Buyer and Seller; (3) the TAD or series of TADs, depending upon the agreement of the parties, is accepted and signed by the Buyer and returned to the Seller; (4) the Seller then sells the TAD(s) received from the Buyer to a financial institution; (5) based primarily upon the financial strength of the Buyer, this institution then advances an agreed to portion of the face amount of the TAD(s) to the Seller; and (6) this institution holds the TADs until their due date and then deposits them for collection through the normal banking system for collection against the Buyer's account.

When this new financing and collection method is used, the financial institution may or may not offer credit "insurance" to a Seller in the same manner as offered in the traditional account receivable financing method described above.

DETAILED DESCRIPTION OF A PREFERRED FORM OF THE FINANCING METHOD INCORPORATING NEW USE OF TADS

In accordance with the principles of this invention, a Seller and a Financial Institution first conclude a TAD Participation Agreement as explained previously.

After the TAD Participation Agreement has been concluded between the Seller and the Financial Institution, the Seller solicits participation of Buyers. Once a suitable Buyer is willing to participate, the Buyer and the Seller conclude a TAD Program Agreement also as explained previously.

Once both the TAD Participation Agreement and the TAD Program Agreement have been executed by the parties, a typical transaction will proceed in the following sequence.

1. The Buyer sends Seller a purchase order for goods and/or services.

2. The Seller notifies the Financial Institution about the Seller's receipt of the purchase order and requests the Financial Institution to pre-approve the Buyer and the proposed transaction.

3. If the Financial Institution so pre-approves, the Seller ships the goods to the Buyer and/or supplies the services to the Buyer. If the Financial Institution refuses to pre-approve, the transaction is aborted.

4. The Seller, in addition to shipping the goods to the Buyer and/or supplying the services to the Buyer, prepares and sends to Buyer one or more TADs, each TAD specifying the due date for the payment set forth in the TAD, the specific account of the Buyer, and the specific bank in which this account is maintained.

5. After the Buyer has accepted these goods and/or services, the Buyer signs the TAD or TADs received from the Seller and returns them to the Seller as complete payment. If the Buyer does not accept these goods and/or services or otherwise fails to sign and return the TADs, Buyer and/or Seller will have recourse pursuant to the TAD Program Agreement, but the Financial Institution will not participate further in the transaction.

6. After the Buyer has signed each TAD and returned it to the Seller, the Seller endorses each TAD and tenders it to the Financial Institution for purchase in accordance with the TAD Participation Agreement.

7. If nothing adverse to Buyer's credit has occurred since the date at which the Financial Institution has approved the transaction, the Financial Institution purchases each TAD from the Seller and pays the Seller the agreed upon advance payment as defined in the TAD Participation Agreement. This advance payment is a major portion of the face amount of each TAD. If the Financial Institution has given the Seller credit "insurance", the Institution guarantees payment of the balance to the Seller, less the fee of the Financial Institution and the charges of the Buyer's bank.

8. On the due date of each TAD, the Financial Institution will deposit each TAD for collection in the normal banking system in the same manner as any check drawn on Buyer's account. To facilitate electronic processing of collection, the Financial Institution may encode each TAD prior to deposit, using a code mutually agreed upon in advance by the Financial Institution and the Buyer's Bank.

9. When the Financial Institution collects payment for each deposited TAD from the Buyer's bank, the Financial institution pays over the balance of the purchase price of each TAD, less the fees charged by the Financial Institution and the Buyer's bank.

If the Buyer's bank refuses payment, and the Financial Institution has issued credit "insurance" to the seller, such refusal will create a legal dispute between the Financial Institution and the Buyer's bank. However, the Financial Institution will pay the Seller in any event, since the Financial Institution has quaranteed such payment in accordance with the TAD Participation Agreement. If the Financial Institution has not issued credit "insurance", and the refusal of payment is made by the Buyer's bank is due to a commercial dispute or any reason other than the Buyer's inability to pay, the Financial Institution charges back the uncollected TAD or TADs to the Seller who is obligated to repay the advance.

While the invention has been described with particular reference to the detailed description, the protection sought is to be limited only by the terms of the claims which follow.

What is claimed is:

1. A financing method incorporating a new use of at least one trade acceptance draft (TAD) which is utilized by a buyer (B), a seller (S) and a financial organization (FO), said method including the following steps:

FO and S conclude a TAD Participation Agreement defining rights and obligations of each party to the other which include the use of TADs;

S and B conclude a TAD Program Agreement under which S agrees to sell goods and/or services to B and B agrees to pay for the goods and/or services by one or more TADs which total the entire amount of the purchase price;

B sends S a purchase order pursuant to the TAD Program Agreement;

S pursuant to the TAD Participation Agreement notifies FO of the order and requests pre-approval by FO;

S upon receipt of FO approval supplies to B said goods and/or services and sends B the TAD or TADs;

B accepts goods and/or services and signs and returns to S the TAD or TADs;

S endorses the TAD or TADs and forwards same to FO;

FO upon receipt of the endorsed TAD or TADs purchases same from S in accordance with the terms of the TAD Participation Agreement and pays over a major percentage of the purchase price to S;

FO, encodes each TAD using a code mutually agreed upon in advance by the FO and B's bank and then upon the due date of the TAD deposits the endorsed TAD or TADs for collection in the normal banking system in the same manner as any check drawn upon B's account; and FO collects the purchase price from B's bank and thereafter remits the balance of the purchase price, less the fees and charges of FO, to S.

2. The method of claim 1 wherein in step FO also guarantees payment of of the TADs if B's bank refuses payment.

3. The method of claim 1 wherein in step FO does not guarantee payment of of the TADs if B's bank refuses payment.

4. The method of claim 1 wherein in step FO must review the proposed transaction and B's credit history to approve the credit risk.

5. The method of claim 4 wherein in step FO must review the proposed transaction and B's credit history to approve the credit risk.

6. A new method of using a trade acceptance draft TAD which is a financial instrument executed by a maker which is for a specific amount payable on a predetermined future date and drawn upon a specific account of the maker maintained at a specific bank, said method comprising the steps of having the maker as a first party sending a TAD to a second party as payment of a debt owned to the second party by the first party;

having the second party upon receipt of said TAD endorse said TAD to a third party;

having the second party selling the endorsed TAD to said third party and delivering said endorsed TAD to said third party whereby said third party receives the endorsed TAD as a holder in due course.

7. The method of claim 5 including one additional step of having the third party encode the endorsed TAD by a code previously found acceptable by the specific bank prior to elctronically depositing the endorsed TAD at said pretermined future date in said specific bank.

8. The method of claim 7 including a second additional step of said third party having legal claims for collecting the specific amount from either one of said first and second parties if the TAD is dishonored for collection by said specific bank.

* * * * *